(12) United States Patent
Kuo et al.

(10) Patent No.: US 12,519,285 B2
(45) Date of Patent: Jan. 6, 2026

(54) PHOTONIC CRYSTAL SURFACE-EMITTING LASER AND OPTICAL SYSTEM

(71) Applicant: HON HAI PRECISION INDUSTRY CO., LTD., New Taipei (TW)

(72) Inventors: Hao-Chung Kuo, New Taipei (TW); Kuo-Bin Hong, New Taipei (TW); Shih-Chen Chen, New Taipei (TW); Kuo-Fong Tseng, New Taipei (TW); Tzu-Hsiang Lan, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 637 days.

(21) Appl. No.: 17/969,906

(22) Filed: Oct. 20, 2022

(65) Prior Publication Data
US 2023/0140206 A1 May 4, 2023

(30) Foreign Application Priority Data
Oct. 28, 2021 (TW) ................................. 110140178

(51) Int. Cl.
*H01S 3/00* (2006.01)
*H01S 5/02335* (2021.01)
(Continued)

(52) U.S. Cl.
CPC ........ *H01S 5/02335* (2021.01); *H01S 5/0239* (2021.01); *H01S 5/04253* (2019.08); *H01S 5/04257* (2019.08); *H01S 5/06203* (2013.01); *H01S 5/11* (2021.01); *H01S 5/18* (2013.01); *H01S 5/02476* (2013.01); *H01S 5/04254* (2019.08); *H01S 5/04256* (2019.08); *H01S 5/06226* (2013.01)

(58) Field of Classification Search
CPC ............... H01S 5/02335; H01S 5/0239; H01S 5/04253; H01S 5/04257; H01S 5/06203; H01S 5/11; H01S 5/18; H01S 5/02476; H01S 5/04254; H01S 5/04256; H01S 5/06226
See application file for complete search history.

(56) References Cited

U.S. PATENT DOCUMENTS

2006/0227830 A1* 10/2006 Keady .................. F03H 1/0081
372/39
2007/0248128 A1 10/2007 Krestnikov et al.
(Continued)

*Primary Examiner* — Kinam Park
(74) *Attorney, Agent, or Firm* — ScienBiziP, P.C.

(57) ABSTRACT

A photonic crystal surface-emitting laser includes a light emitting module and a driving module. The light emitting module includes a photonic crystal layer, an active light emitting layer on a side of the photonic crystal layer, a first electrode on a side of the active light emitting layer facing away from the photonic crystal layer, and a second electrode partially on the side of the active light emitting layer facing away from the photonic crystal layer. The driving module makes electrical contact with surfaces of the first electrode and the second electrode facing away from the photonic crystal layer. The driving module outputs driving signals to the first electrode and the second electrode to drive the active light emitting layer to generate photons. The photons are incident into the photonic crystal layer to generate a laser light through oscillation on Bragg diffraction. An optical system is also disclosed.

20 Claims, 11 Drawing Sheets

(51) Int. Cl.
  *H01S 5/0239*  (2021.01)
  *H01S 5/042*   (2006.01)
  *H01S 5/062*   (2006.01)
  *H01S 5/11*    (2021.01)
  *H01S 5/18*    (2021.01)
  H01S 5/024     (2006.01)

(56) References Cited

U.S. PATENT DOCUMENTS

2009/0311816 A1\* 12/2009 Lee ................... H01L 25/0753
                                                  257/E33.068
2010/0288341 A1\* 11/2010 Kim ..................... H10F 77/14
                                                  372/39
2020/0091683 A1   3/2020 Ohira et al.
2020/0153204 A1   5/2020 Hatzilias et al.
2023/0030283 A1\*  2/2023 Chen ............... H10K 59/80515

\* cited by examiner

PHOTONIC CRYSTAL SURFACE-EMITTING LASER AND OPTICAL SYSTEM

FIELD

The subject matter relates to optical detection, and more particularly, to a photonic crystal surface-emitting laser and an optical system using the photonic crystal surface-emitting laser.

BACKGROUND

A Photonic crystal surface-emitting laser (PCSEL) has advantages of excellent beam quality, small size, low energy consumption, easy integration, and high reliability and can be widely used in optical systems such as systems for three-dimensional detection, consumer electronic devices, automotive LIDARS, smart devices, and medical examination devices.

A main structure of an existing PCSEL includes an epitaxial substrate with a thickness of at least 100 microns, for maintaining and increasing strength of a chip in the PCSEL. During application of high electric currents, an active light-emitting layer will generate a lot of heat, the heat is transferred by the epitaxial substrate and a packaging material of the PCSEL. However, the epitaxial substrate increases the length of the heat-dissipation path, efficiency of heat dissipation becomes low, an optical output power of the PCSEL is decreased, and a service life is shortened. The existing PCSEL has a light-emitting area, and an electrode wiring area around the light emitting area must be reserved. An area of the electrode wiring area is several times an area of the light-emitting area, this is not optimal, and a cost of the packaging material is increased. Parasitic capacitance and inductance of the electrode wiring area is common, reducing a response speed of the PCSEL and making high-frequency operation of the PCSEL problematic. In the existing PCSEL, a density of electric current applied to the active light-emitting layer tends to be uneven due to different diffusion speeds of electric currents in various directions.

Therefore, the existing PCSEL needs to be improved.

SUMMARY

A first aspect of the present disclosure provides a photonic crystal surface-emitting laser, including:
  a light emitting module, including:
    a photonic crystal layer,
    an active light emitting layer on a side of the photonic crystal layer,
    a first electrode on a side of the active light emitting layer facing away from the photonic crystal layer, and
    a second electrode at least partially on the side of the active light emitting layer facing away from the photonic crystal layer; and
  a driving module in electrical contact with surfaces of the first electrode and the second electrode facing away from the photonic crystal layer, wherein the driving module is configured to output driving signals to the first electrode and the second electrode to drive the active light emitting layer to generate photons, the photons are incident into the photonic crystal layer to generate a laser light through oscillation on Bragg diffraction.

A second aspect of the present disclosure provides an optical system comprising the above photonic crystal surface-emitting laser and a control device, the control device is electrically connected with the photonic crystal surface-emitting laser and configured to output driving signals to the photonic crystal surface-emitting laser to drive the photonic crystal surface-emitting laser to generate a laser light.

In the photonic crystal surface-emitting laser, the driving module is integrated with the light emitting module, improving a switching speed of the photonic crystal surface-emitting laser. Since there is no substrate for the light emitting module, the first electrode and the second electrode of the light-emitting module are directly bonded to the driving module instead of being separated by a substrate. This improves heat dissipation from the light emitting module, and thus the light emitting power and service life of the photonic crystal surface-emitting laser are improved.

DETAILED DESCRIPTION

Implementations of the disclosure will now be described, by way of embodiments only, with reference to the drawings. The disclosure is illustrative only, and changes may be made in the detail within the principles of the present disclosure. It will be appreciated that the embodiments may be modified within the scope of the claims.

Unless otherwise defined, all technical terms used herein have the same meaning as commonly understood by one of ordinary skill in the art. The technical terms used herein are to provide a thorough understanding of the embodiments described herein, but are not to be considered as limiting the scope of the embodiments. The term "comprising," when utilized, means "including, but not necessarily limited to"; it specifically indicates open-ended inclusion or membership in the so-described combination, group, series, and the like.

Figure 1:
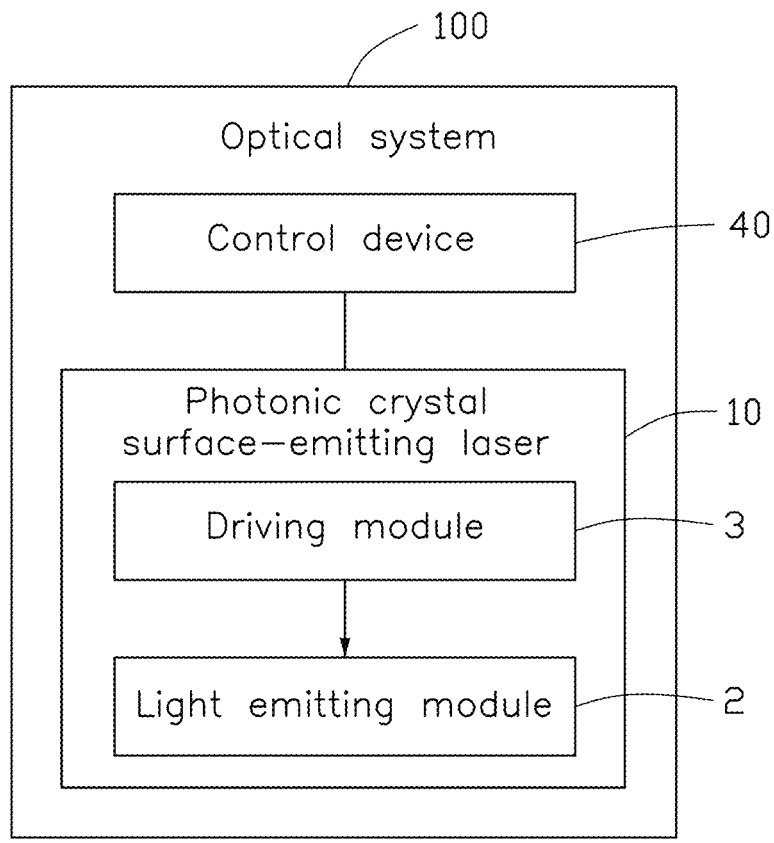
FIG. 1 is a block diagram of an optical system according to an embodiment of the present disclosure.

Referring to FIG. 1, an optical system 100 of an embodiment of the present disclosure includes a photonic crystal surface-emitting laser 10. The optical system 100 can be a face recognition sensor, a laser radar, etc., which can be applied to various electronic devices such as smart phones, augmented reality (AR) glasses, and virtual reality (VR) glasses, and can also be applied to automobiles, household, medical equipment, or unmanned vehicles, for use in smart chemical plants or automated warehouses.

The optical system 100 further includes a control device (not shown), the control device is electrically connected with the photonic crystal surface-emitting laser 10. When the photonic crystal surface-emitting laser 10 is applied in the above various optical systems 100, it is configured to emit a laser light according to driving signals output by the control device, so that the optical system 100 can implements such functions as interactive display, safety recognition, indoor environment sensing, or proximity sensing. In this embodiment, the control device may be a chip, a chip group, a control motherboard, etc.

The photonic crystal surface-emitting laser 10 includes a light emitting module 2 and a driving module 3 electrically connected to each other. The driving module 3 is configured to apply a driving signal (driving voltage or driving current) to the light emitting module 2, and the light emitting module 2 is configured to emit a laser light according to the driving signal (driving voltage or driving current).

Figure 2:
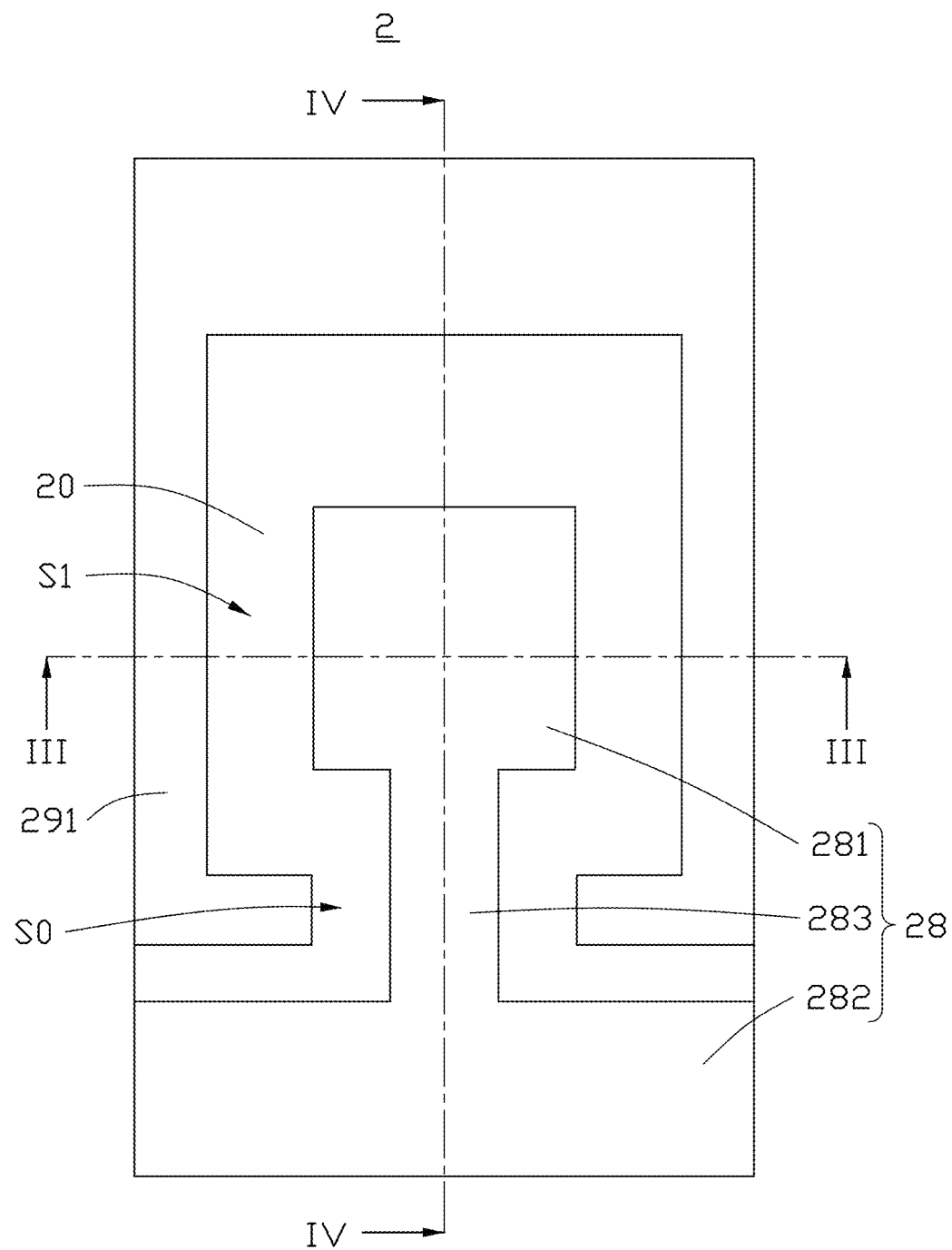
FIG. 2 is a schematic plan view of a light-emitting module of the optical system of FIG. 1.
Figure 3:
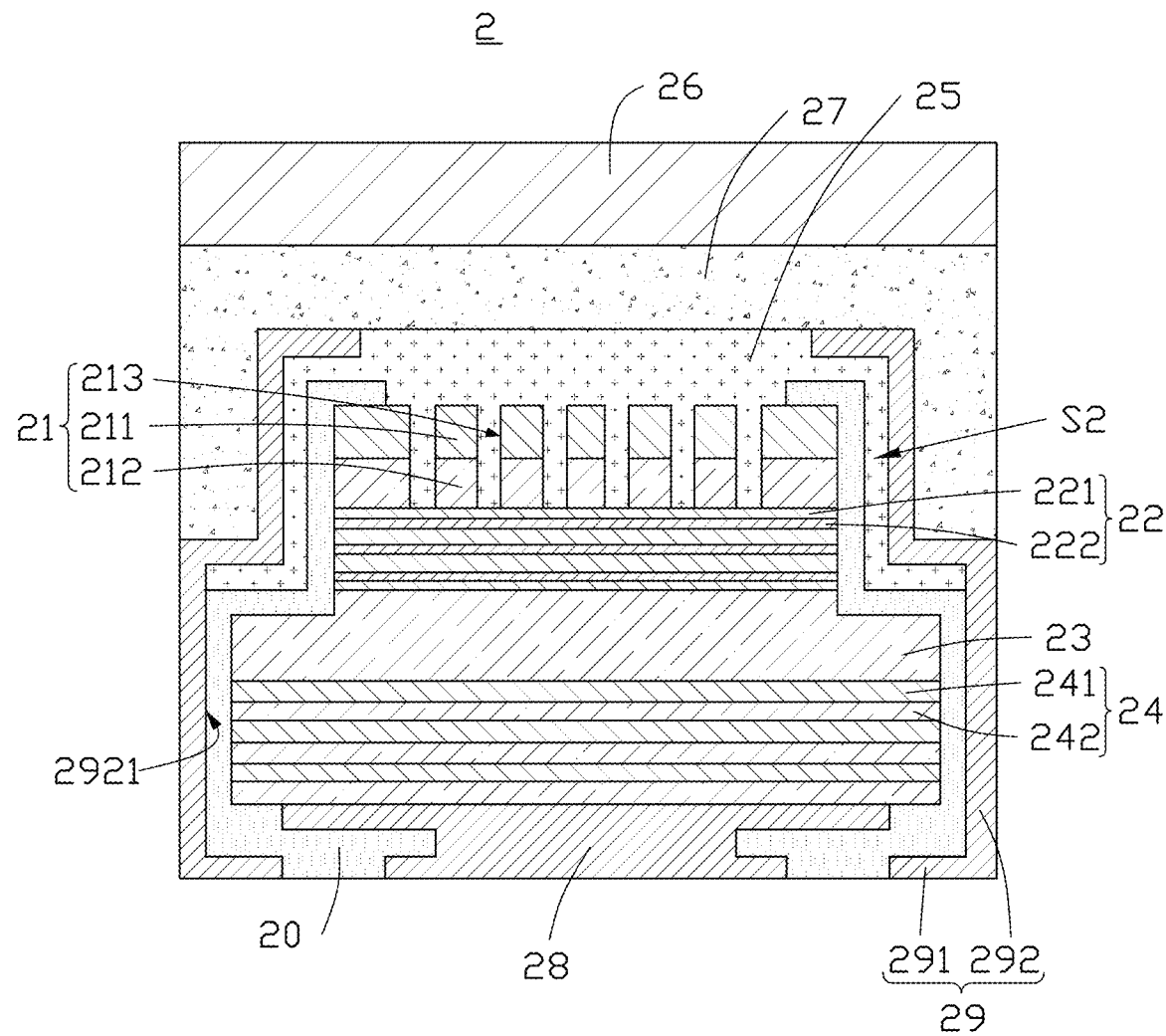
FIG. 3 is a cross-sectional view along line III-III of FIG. 2.

Referring to FIGS. 2 and 3, the light emitting module 2 includes a photonic crystal layer 21, an active light emitting layer 22, a first cladding layer 23, and a Bragg mirror 24, these are sequentially stacked.

The photonic crystal layer 21 includes an ohmic contact layer 211 and a stacked second cladding layer 212, the second cladding layer 212 is located between the ohmic contact layer 211 and the active light emitting layer 22. In this embodiment, the ohmic contact layer 211 is made of P-type gallium arsenide, and the second cladding layer 212 is made of P-type aluminum gallium arsenide. In other embodiments, the ohmic contact layer 211 may also be made of indium phosphide or indium gallium arsenide. The photonic crystal layer 21 defines a plurality of through holes 213 which are spaced from each other. Each through hole 213 penetrates through the ohmic contact layer 211 and the second cladding layer 212.

The active light emitting layer 22 includes a plurality of quantum well active light emitting layers 221 and a plurality of energy barrier layers 222. The plurality of quantum well active light emitting layers 221 and the plurality of energy barrier layers 222 are stacked in alternating fashion. That is, the quantum well active light emitting layer 221 and the energy barrier layer 222 are arranged alternately. In this embodiment, the active light-emitting layer 22 includes three quantum well active light-emitting layers 221 individually sandwiched between four energy barrier layers 222. A material of each quantum well active light-emitting layer 221 is indium gallium arsenide, and a material of each energy barrier layer 222 is gallium arsenide, which is configured to emit a laser light in a wavelength range from 905 to 1550 nm. In other embodiments, the quantum well active light emitting layers 221 may also be made of aluminum gallium indium arsenide or indium gallium arsenide, and the energy barrier layers 222 may also be made of aluminum gallium arsenide or aluminum gallium indium arsenide.

The active light emitting layer 22 is configured to generate photons under driving of the driving signal. The photons generated by the active light emitting layer 22 propagate everywhere, and the photons propagating into the photonic crystal layer 21 repeatedly oscillate in the photonic crystal layer 21 until the light emitting module 2 reaches a state of balance between gain and loss and a laser light is generated.

A material of the first cladding layer 23 may be N-type aluminum gallium arsenide. The first cladding layer 23 and the second cladding layer 212 cooperate to lock in the photons emitted from the active light emitting layer 22, reducing the propagation of photons toward the Bragg mirror 24. In this embodiment, the material of the first cladding layer 23 is aluminum gallium arsenide. In other embodiments, materials of the first cladding layer 23 and the second cladding layer 212 may also be indium aluminum arsenide, indium phosphide, or gallium phosphorus arsenide.

The Bragg mirror 24 includes a plurality of first refractive layers 241 and a plurality of second refractive layers 242 stacked in an alternating fashion. The first refractive layers 241 have the same refractive index, the second refractive layers 242 have the same refractive index, and the refractive indices of one first refractive layer 241 and one second refractive layer 242 are different. The Bragg mirror 24 is configured to reflect the received photons toward the photonic crystal layer 21 to recover photons escaping from the first coating layer 23. This reduces light loss and improves light emitting power of the photonic crystal surface-emitting laser 10. In this embodiment, the Bragg mirror 24 includes three first refractive layers 241 and three second refractive layers 242, these are arranged in an alternating fashion.

Referring to FIGS. 2 and 3, the light emitting module 2 further includes a transparent conductive layer 25, a light-transmitting substrate 26, and a thermally conductive adhesive layer 27.

The thermally conductive adhesive layer 27 is located between the transparent conductive layer 25 and the light-transmitting substrate 26, the thermally conductive adhesive layer 27 bonds and fixes together the transparent conductive layer 25 and the light transmitting substrate 26 and guides heat generated during operation of the light emitting module 2. The transparent conductive layer 25 is on a side of the photonic crystal layer 21 facing away from the Bragg mirror 24 and fills the through holes 213 which are spaced and distributed in the photonic crystal layer 21. The light-transmitting substrate 26 is on the side of the transparent conductive layer 25 facing away from the Bragg mirror 24.

In this embodiment, the transparent conductive layer 25 is indium tin oxide (ITO). The light-transmitting substrate 26 may be made of a light transmitting material such as sapphire, gallium arsenide (GaAs), gallium nitride (GaN), silicon (Si), silicon carbide (SiC), indium phosphide (InP). The laser light generated from the photonic crystal layer 21 is emitted from a surface of the light-transmitting substrate 26 facing away from the Bragg mirror 24.

The light emitting module 2 further includes a first electrode 28 and a second electrode 29 electrically isolated from each other. The first electrode 28 and the second electrode 29 are configured to receive the driving signal. The first electrode 28 and the second electrode 29 are made of metal, such as titanium (Ti), germanium (Ge), nickel (Ni), gold (Au), platinum (Pt), and alloys thereof. In this embodiment, the first electrode 28 is an N-type electrode, and the second electrode 29 is a P-type electrode.

The first electrode 28 is on the side of the Bragg mirror 24 facing away from the light-transmitting substrate 26 and is in direct contact with the Bragg mirror 24. The second electrode 29 includes a first conductive portion 291 and a second conductive portion 292.

The first conductive portion 291 is on the side of the Bragg mirror 24 facing away from the light-transmitting substrate 26. A surface of the first conductive portion 291 facing away from the light-transmitting substrate 26 is flush with a surface of the first electrode 28 facing away from the light transmitting substrate 26. That is, the first conductive portion 291 is coplanar with the first electrode 28.

The first conductive portion 291 encloses a first accommodation space S1 having a notch S0. The first electrode 28 includes a third conductive portion 281, a fourth conductive portion 282, and an extension portion 283 connecting the third conductive portion 281 and the fourth conductive portion 282. The third conductive portion 281 is in the first accommodation space S1, the fourth conductive portion 282 is located outside the first accommodation space S1, and the extension portion 283 extends from the third conductive portion 281 to the fourth conductive portion 282 through the notch S0. The third conductive portion 281 is spaced apart from the first conductive portion 291 to be electrically isolated from each other.

Figure 4:
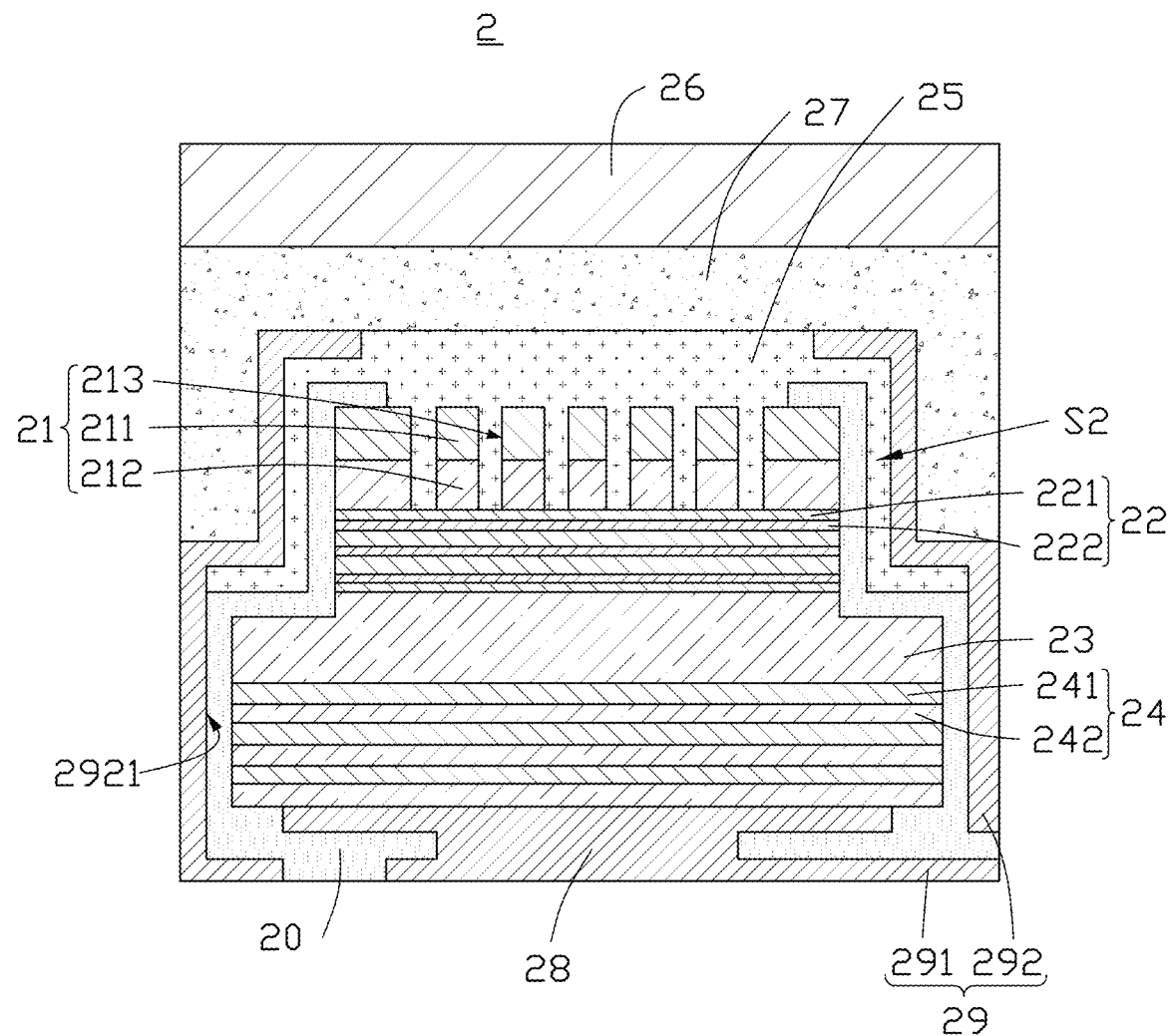
FIG. 4 is a cross-sectional view along line IV-IV of FIG. 2.

Referring to FIGS. 3 and 4, the second conductive portion 292 extends from the first conductive portion 291 towards the light-transmitting substrate 26. The second conductive portion 292 is a cylindrical structure in which a hollow space S2 is formed. The active light emitting layer 22, the first cladding layer 23, and the Bragg mirror 24 are in the hollow space S2. The thermally conductive adhesive layer 27 covers an end face of the second conductive portion 292 near the light-transmitting substrate 26, a part of an outer surface of the second conductive portion 292 (which is the surface of the second conductive portion 292 facing away from the hollow space S2), and the transparent conductive layer 25. One end of the second conductive portion 292 near the light-transmitting substrate 26 is in contact with the transparent conductive layer 25.

In this embodiment, the light emitting module 2 further includes an insulating layer 20. The insulating layer 20 may be silicon nitride ($SiN_x$), silicon dioxide ($SiO_2$), or polymethyl methacrylate (PMMA). The insulating layer 20 is in the hollow space S2 formed on the second conductive part 292 and is partially attached to an inner wall 2921 of the second conductive part 292. The insulating layer 20 is also located between the second conductive part 292 and the photonic crystal layer 21, the active light emitting layer 22, the first coating layer 23, and the Bragg mirror 24.

A portion of the insulating layer 20 which is not attached to the inner wall 2921 of the second conductive portion 292 is gapped from the inner wall 2921, and the transparent conductive layer 25 infills the gap to make electrical contact with the second conductive portion 292.

The insulating layer 20 further extends to the side of the Bragg mirror 24 facing away from the light-transmitting substrate 26 and is located between the first electrode 28 and the first conductive portion 291, so that the first electrode 28 and the first conductive portion 291 are spaced apart and electrically isolated from each other.

When driving signals of respectively different magnitudes are applied to the first electrode 28 and the second electrode 29, the driving current moves from the side of the photonic crystal layer 21 near the light-transmitting substrate 26. The active light emitting layer 22 generates photons under driving of the driving current. When the photons generated by the active light emitting layer 22 propagate to the photonic crystal layer 21, they oscillate repeatedly in the photonic crystal layer 21 until the light emitting module 2 reaches the state of balance between gain and loss and a laser light is generated, and the laser light is emitted from the side of the transparent substrate 26 facing away from the Bragg mirror 24.

In the above process, the first cladding layer 23, the second cladding layer 212, and the Bragg mirror 24 all prevent the emission of photons from the side facing away from the light-transmitting substrate 26, which improves use efficiency, thereby improve the light emitting power of the light emitting module 2.

The third conductive portion 281, the fourth conductive portion 282, and the extension portion 283 are all rectangular as seen in FIG. 2. The first conductive portion 291 is a rectangular frame adapted to a shape of the third conductive portion 281 and having the notch S0. The accommodation space S1 is filled with the insulating layer 20 to electrically insulate the third conductive portion 281 from the first conductive portion 291.

Figure 5:
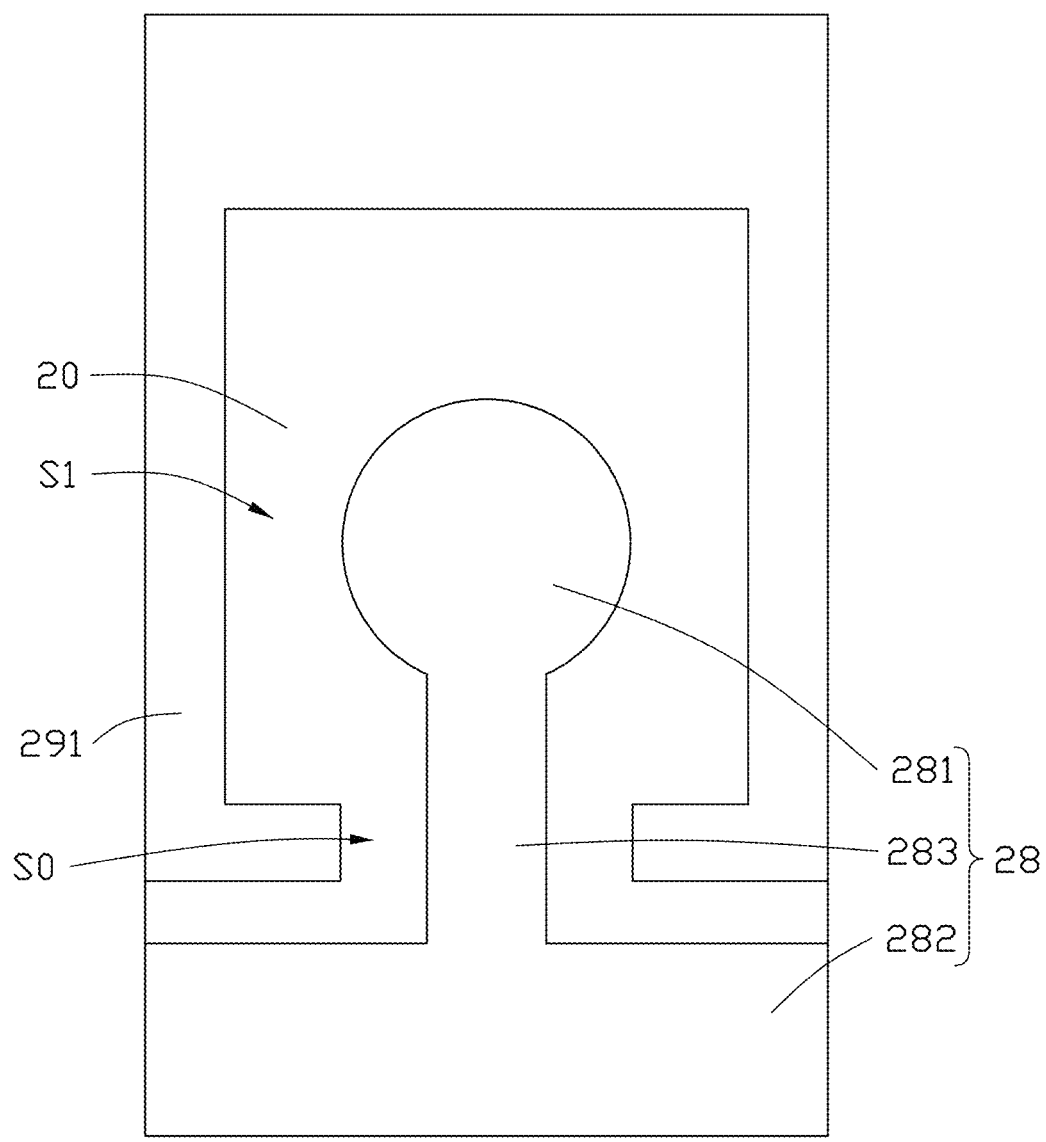
FIG. 5 is a schematic plan view of a photonic crystal surface-emitting laser according to another embodiment of the present disclosure.

In other embodiments, the third conductive portion 281 and the first conductive portion 291 may have other shapes. For example, as shown in FIG. 5, the third conductive portion 281 may be circular, and the first conductive portion 291 may be a circular ring adapted to the shape of the third conductive portion 281, and having the notch S0.

The shape of the third conductive portion 281 as seen in FIG. 2 is the same as a shape of the orthographic projection of the third conductive portion 281 onto the active light emitting layer 22. The third conductive portion 281 is opposite to the photonic crystal layer 21, and an orthographic projection of the photonic crystal layer 21 onto the active light emitting layer 22 is within an orthographic projection of the third conductive portion 281 onto the active light emitting layer 22. That is, the orthographic projection of the third conductive portion 281 onto the active light emitting layer 22 overlaps with the orthographic projection of the photonic crystal layer 21 onto the active light emitting layer 22, and an orthographic projection area of the third conductive portion 281 onto the active light emitting layer 22 is equal to or greater than an orthographic projection area of the photonic crystal layer 21 onto the active light emitting layer 22.

The through holes 213 spaced and distributed in the photonic crystal layer 21 create a large impedance at their individual locations but the impedance at other locations is small. A difference in impedance across all the locations of the photonic crystal layer 21 may cause the driving current to diffuse unevenly in a horizontal direction, as shown in FIG. 3 or FIG. 4. In this embodiment, when the first electrode 28 receives the driving signal, the location and shape of the third conductive portion 281 of the first electrode 28 promotes a uniform diffusion of the driving current in the horizontal direction.

Figure 6:
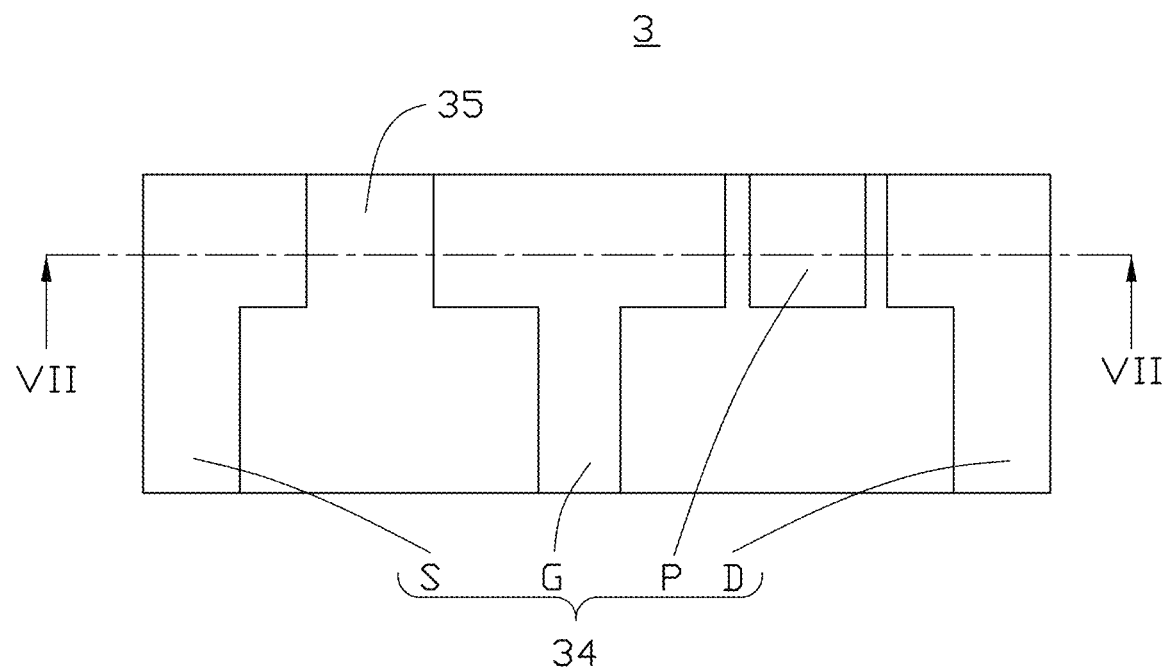
FIG. 6 is a schematic plan view of a driving module of the optical system of FIG. 1.
Figure 7:
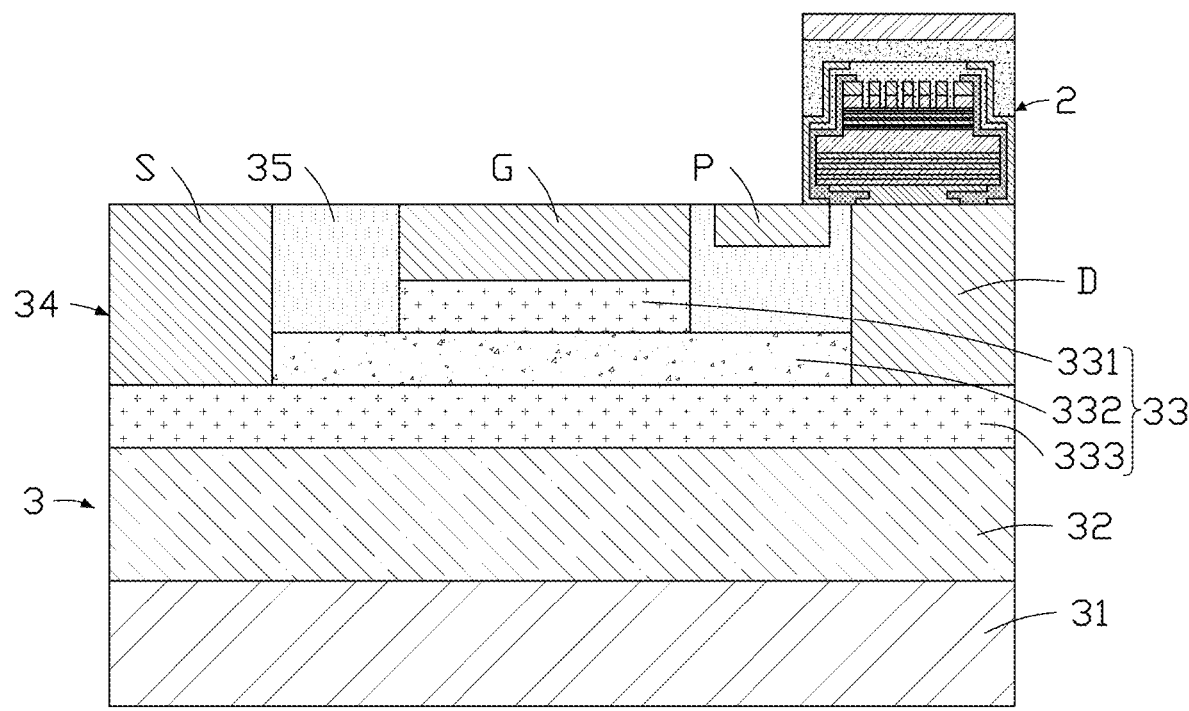
FIG. 7 is a cross-sectional view of the light-emitting module and the driving module taken along line VII-VII of FIG. 6.

Referring to FIGS. 6 and 7, the driving module 3 is a transistor. In this embodiment, the driving module 3 is a transistor with a high electron mobility (HEMT), such as gallium nitride transistor.

The driving module 3 includes a substrate 31, a buffer layer 32, a channel layer 33, and an electrode layer 34 which are sequentially stacked.

A material of the substrate 31 is sapphire, silicon, silicon oxide, silicon carbide, or diamond. The substrate 31 is configured to support the buffer layer 32, the channel layer 33, and the electrode layer 34 during processing. The buffer layer 22 is on one surface of the substrate 31 and may be made of gallium nitride or aluminum nitride.

The channel layer 33 includes a P-type gallium nitride layer 331, an aluminum gallium nitride barrier layer 332, and a non-doped gallium nitride channel 333 which are sequentially stacked.

A material of the electrode layer 34 may be titanium (Ti), aluminum (Al), nickel (Ni), gold (Au), or palladium (Pd). The electrode layer 34 includes a gate electrode G, a source electrode S, a drain electrode D, and a connecting electrode P. The gate electrode G, the source electrode S, the drain electrode D, and the connecting electrode P are spaced and insulated from each other. In this embodiment, the driving module 3 further includes an insulating material layer 35, which is located between the gate electrode G, the source electrode S, the drain electrode D, and the connecting electrode P to create a separation between the gate electrode G, the source electrode S, the drain electrode D, and the connecting electrode P.

The P-type gallium nitride layer 331 is in direct contact with the gate electrode G, and the P-type gallium nitride layer 331 is insulated from the source electrode S, the drain electrode D, and the connecting electrode P because of the insulating material layer 35. The aluminum gallium nitride energy barrier layer 332 and the non-doped gallium nitride channel 333 are in contact with the source electrode S and the drain electrode D, respectively.

The drain electrode D is in contact with the first electrode 28 to apply a negative voltage to the first electrode 28. The connecting electrode P is in contact with the second electrode 29 to apply a positive voltage to the second electrode 29. The positive voltage and the negative voltage are the above-mentioned driving signals. The driving signals cause a voltage difference between the first electrode 28 and the second electrode 29. A current loop (that is, a driving current) is formed in the light emitting module 2 to emit a laser light. The non-doped gallium nitride channel 333 serves as the main conducting semiconductor channel, and the arrangement of the P-type gallium nitride layer 331 raises the height of the energy barrier of the aluminum gallium nitride energy barrier layer 332 above the Fermi energy level.

The drain electrode D and the first electrode 28, and the connecting electrode P and the second electrode 29 are fixed by metal bonding. The bonding method for metals is, for example, a face-to-face bonding technique for gold to gold.

In other embodiments, the driving module 12 does not include the connecting electrode P, and the second electrode 29 would be in direct contact with the gate electrode G. The gate electrode G would provide driving signals for the second electrode 29. That is, the voltage on the gate electrode G would be the driving signals of the second electrode 29. Compared with the manner of electrically connecting the second electrode 29 through the connecting electrode P, the step of forming the connecting electrode P is omitted in the above arrangement.

When the voltage on the gate electrode G reaches the turn-on voltage of the driving module 3, the channel layer 33 is turned on, the source electrode S is electrically connected to the drain electrode D, and the drain electrode D applies a negative voltage (driving signal) to the first electrode 28. The connecting electrode P receives a positive voltage (driving signal) and applies the positive voltage to the second electrode 29. The light emitting module 2 emits a laser light under the driving of the driving signal.

In the photonic crystal surface-emitting laser 10, the driving module 3 is integrated with the light emitting module 2, the driving module 3 is a gallium nitride transistor with a high electron mobility (in some embodiments, the electron mobility can be more than 2000 $cm^2/V \cdot s$), which improves switching speed of the photonic crystal surface-emitting laser 10. The light emitting module 2 generates heat during operation. The light emitting module 2 does not include a substrate as the first electrode 28 and the second electrode 29 of the light-emitting module 2 are directly bonded to the electrode layer 34 of the driving module 3 instead of being separated by a substrate, this enables rapid and powerful heat dissipation from the light emitting module 2, and thus the light emitting power and service life of the photonic crystal surface-emitting laser 10 are improved.

Heat dissipation of the photonic crystal surface-emitting lasers in the examples and comparative examples is described below.

Figure 8:
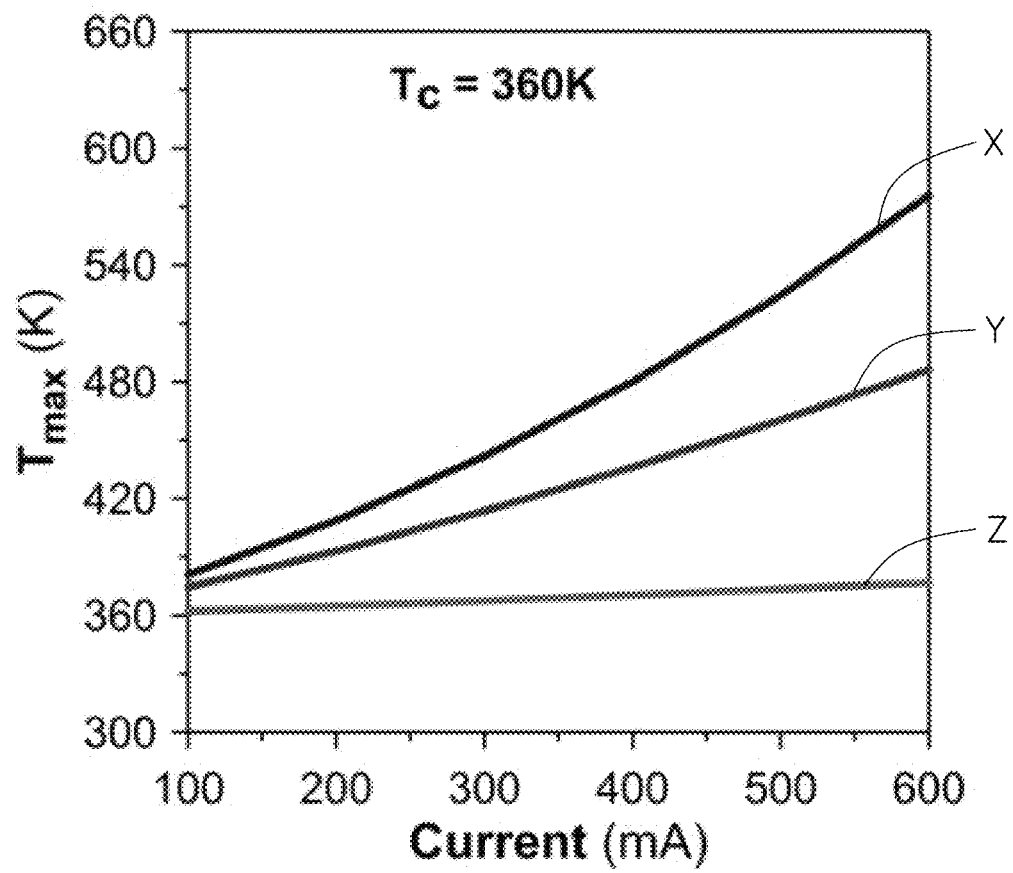
FIG. 8 is a graph depicting the relationship between the operating temperature and the driving current of different photonic crystal surface-emitting lasers at an ambient temperature of 360K.

FIG. 8 is a graph depicting the relationship between the operating temperature and the driving current of different photonic crystal surface-emitting lasers at an ambient temperature of 360K. In FIG. 8, curve X represents the photonic crystal surface-emitting laser in a first comparative example, curve Y represents the photonic crystal surface-emitting laser in a second comparative example, and curve Z represents the photonic crystal surface-emitting laser in an embodiment of the present disclosure. As can be seen from FIG. 8, under the same ambient temperature, when the driving current is equal, the operating temperature corresponding to the curve Z is the smallest, that is, the operating temperature of the photonic crystal surface-emitting laser in the present disclosure is the lowest and the heat dissipation is the most effective.

Figure 9:
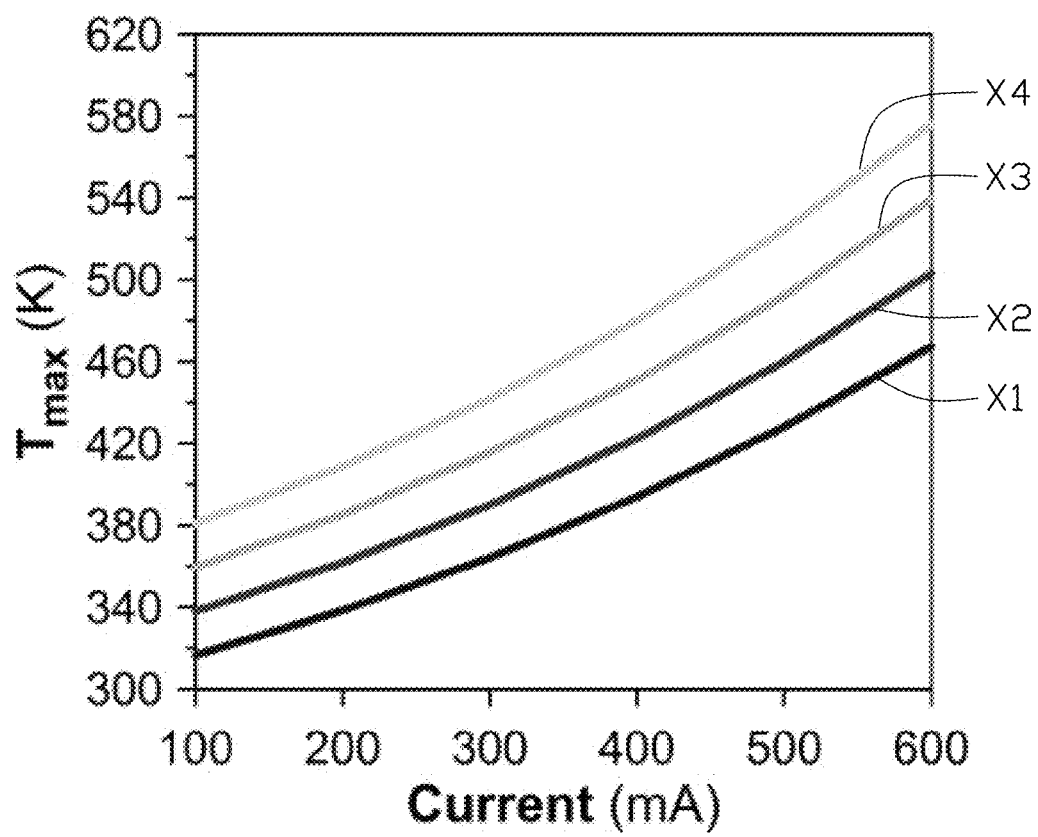
FIG. 9 is a graph depicting the relationship between the operating temperature and the driving current of a photonic crystal surface-emitting laser at different ambient temperatures in a first comparative example.

FIG. 9 is a graph depicting the relationship between the operating temperature and the driving current of the photonic crystal surface-emitting laser at different ambient temperatures in the first comparative example. In FIG. 9, curves X1, X2, X3, and X4 are curves of the operating temperature with the driving current at the ambient temperatures Tc of 300K, 320K, 340 k, and 360K, respectively.

Figure 10:
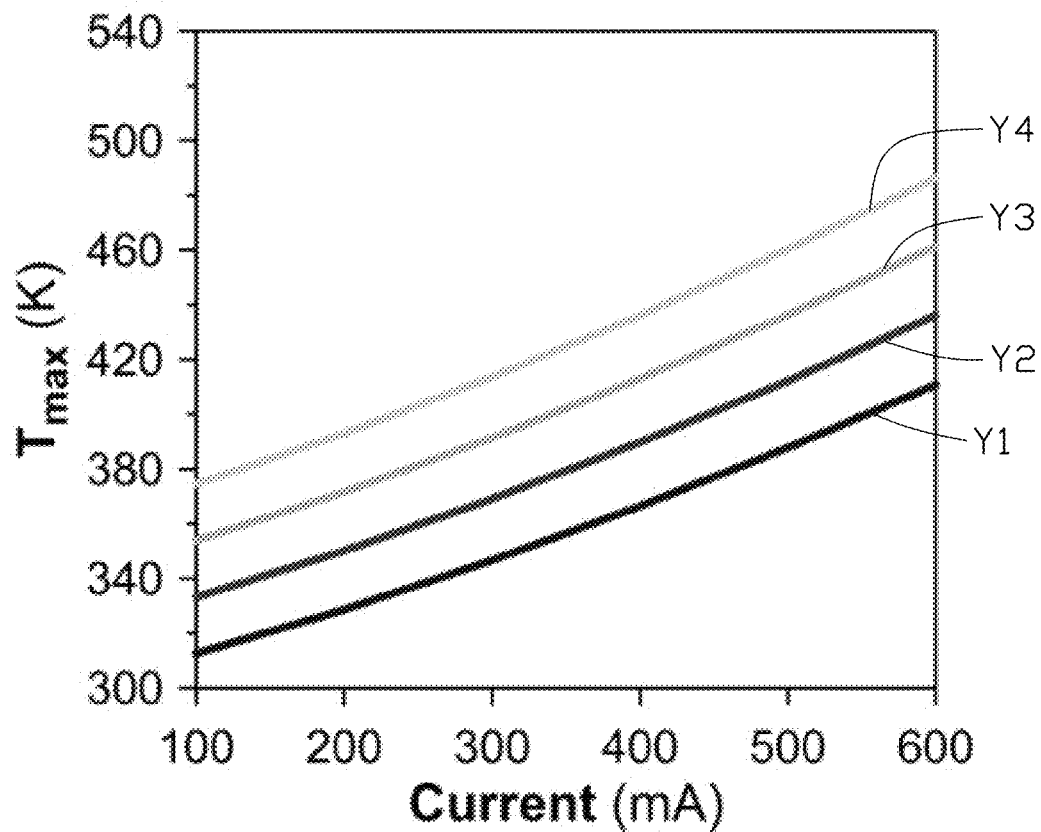
FIG. 10 is a graph depicting the relationship between the operating temperature and the driving current of a photonic crystal surface-emitting laser at different ambient temperatures in a second comparative example.

FIG. 10 is a graph depicting the relationship between the operating temperature and the driving current of a photonic crystal surface-emitting laser at different ambient temperatures in the second comparative example. In FIG. 10, curves Y1, Y2, Y3, and Y4 are curves of the operating temperature with the driving current at the ambient temperatures Tc of 300K, 320K, 340 k, and 360K, respectively.

Figure 11:
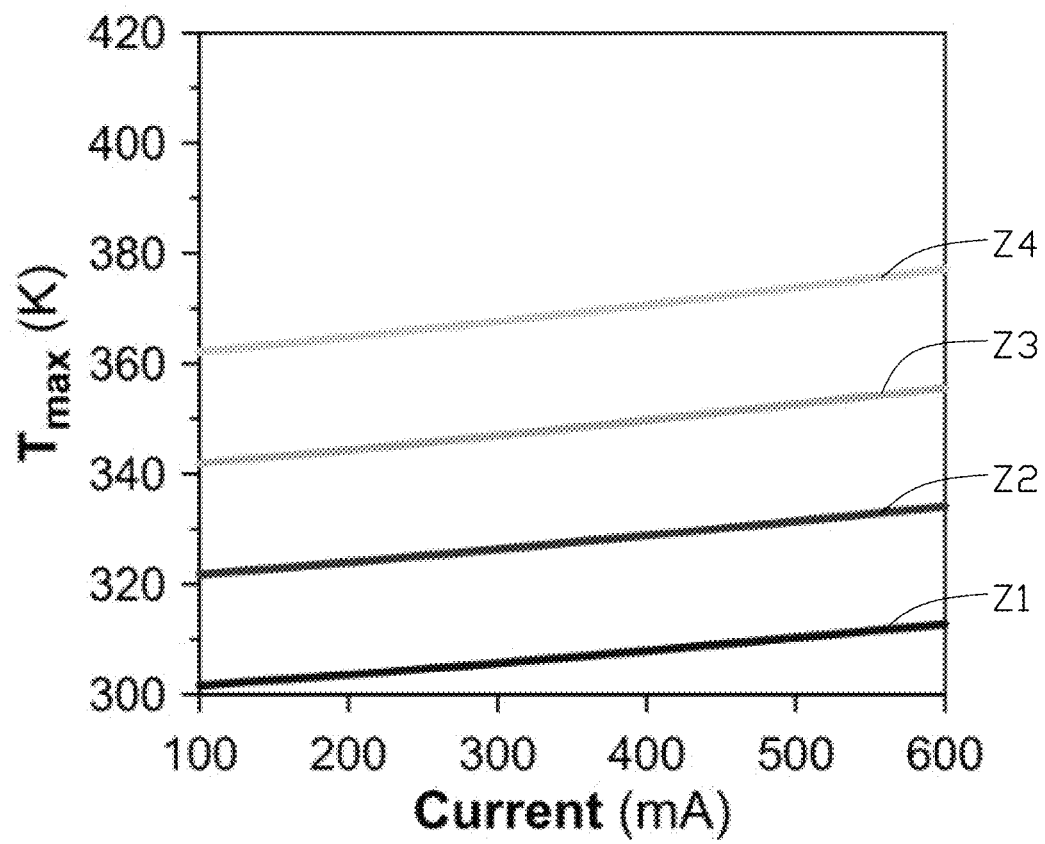
FIG. 11 is a graph depicting the relationship between the operating temperature and the driving current of this embodiment of a photonic crystal surface-emitting laser at different ambient temperatures.

FIG. 11 is a graph depicting the relationship between the operating temperature and the driving current of a photonic crystal surface-emitting laser at different ambient temperatures in an embodiment of the present disclosure. In FIG. 11, curves Z1, Z2, Z3, and Z4 are curves of the operating temperature with the driving current at the ambient temperatures Tc of 300K, 320K, 340 k, and 360K, respectively.

At any particular ambient temperature, when the driving currents are equal, the operating temperature corresponding to the curve Z (Z1, Z2, Z3 and Z4) is the least, that is, the operating temperature of the photonic crystal surface-emitting laser in an embodiment of the present disclosure is the lowest and the heat dissipation is the most effective.

The driving module 3 is integrated with the light emitting module 2, and there is no substrate, which is also advantageous to miniaturization of the structure. Since the first electrode 28 and the second electrode 29 are coplanar, an area of perforations to allow electrical connections is not needed, which reduces the area of the light emitting module 2 and avoids parasitic capacitances and inductances inherent in a perforated area.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A photonic crystal surface-emitting laser, comprising:
a light emitting module, comprising:
a photonic crystal layer,
an active light emitting layer on a side of the photonic crystal layer,
a first electrode on a side of the active light emitting layer facing away from the photonic crystal layer, and
a second electrode at least partially on the side of the active light emitting layer facing away from the photonic crystal layer; and
a driving module in electrical contact with surfaces of the first electrode and the second electrode facing away from the photonic crystal layer, wherein the driving module is configured to output driving signals to the first electrode and the second electrode to drive the active light emitting layer to generate photons, the photons are incident into the photonic crystal layer to generate a laser light through oscillation on Bragg diffraction.

2. The photonic crystal surface-emitting laser of claim 1, wherein the second electrode comprises a first conductive portion and a second conductive portion electrically connected with each other, the first conductive portion is on the side of the active light emitting layer facing away from the photonic crystal layer, the second conductive portion extends from an edge of the first conductive portion towards the photonic crystal layer, the second conductive portion is a cylindrical structure in comprising a hollow space, the photonic crystal layer and the active light emitting layer are in the hollow space.

3. The photonic crystal surface-emitting laser of claim 2, wherein the light emitting module further comprises a transparent conductive layer, the transparent conductive layer is on the side of the photonic crystal layer facing away from the active light emitting layer and is in the hollow space, an end of the second conductive portion of the second electrode near the photonic crystal layer is in contact with the transparent conductive layer.

4. The photonic crystal surface-emitting laser of claim 2, wherein the first electrode comprises a third conductive portion, an orthographic projection of the photonic crystal layer onto the active light emitting layer is within an orthographic projection of the third conductive portion onto the active light emitting layer.

5. The photonic crystal surface-emitting laser of claim 4, wherein the first conductive portion of the second electrode encloses an accommodation space having a notch, the third conductive portion is in the accommodation space.

6. The photonic crystal surface-emitting laser of claim 5, wherein the first electrode further comprises a fourth conductive portion and an extension portion, the extension portion extends from the third conductive portion to the fourth conductive portion through the notch, the fourth conductive portion is located outside the accommodation space.

7. The photonic crystal surface-emitting laser of claim 1, wherein the driving module is a transistor.

8. The photonic crystal surface-emitting laser of claim 7, wherein the driving module is a gallium nitride transistor.

9. The photonic crystal surface-emitting laser of claim 7, wherein the driving module comprises an electrode layer, the electrode layer comprises a gate electrode, a source electrode, and a drain electrode insulated from each other; the gate electrode is in contact with the second electrode, the drain electrode is in contact with the first electrode, when a voltage on the gate electrode is greater than a threshold voltage of the driving module, the source electrode and the drain electrode are turned on, and the drain electrode and the gate electrode are configured to apply the driving signals to the first electrode and the second electrode.

10. The photonic crystal surface-emitting laser of claim 7, wherein the driving module comprises an electrode layer, the electrode layer comprises a gate electrode, a source electrode, a drain electrode, and a connecting electrode insulated from each other; the drain electrode is in contact with the first electrode, the drain electrode is in contact with the first electrode, when a voltage on the gate electrode is greater than a threshold voltage of the driving module, the source electrode and the drain electrode are turned on, the drain electrode is configured to apply the driving signals to the first electrode; the connecting electrode is in contact with the second electrode and configured to apply the driving signals to the second electrode.

11. An optical system, comprising:
a photonic crystal surface-emitting laser, comprising:
a light emitting module, comprising:
a photonic crystal layer,
an active light emitting layer on a side of the photonic crystal layer,
a first electrode on a side of the active light emitting layer facing away from the photonic crystal layer, and
a second electrode at least partially on the side of the active light emitting layer facing away from the photonic crystal layer, and
a driving module in electrical contact with surfaces of the first electrode and the second electrode facing away from the photonic crystal layer; and
a control device electrically connected with the photonic crystal surface-emitting laser and configured to output the driving signals to the photonic crystal surface-emitting laser to drive the photonic crystal surface-emitting laser to generate a laser light;
wherein the driving module is configured to output driving signals to the first electrode and the second electrode to drive the active light emitting layer to generate photons, the photons are incident into the photonic crystal layer to generate a laser light through oscillation on Bragg diffraction.

12. The optical system of claim 11, wherein the second electrode comprises a first conductive portion and a second conductive portion electrically connected with each other, the first conductive portion is on the side of the active light emitting layer facing away from the photonic crystal layer, the second conductive portion extends from an edge of the first conductive portion towards the photonic crystal layer, the second conductive portion is a cylindrical structure in comprising a hollow space, the photonic crystal layer and the active light emitting layer are in the hollow space.

13. The optical system of claim 12, wherein the light emitting module further comprises a transparent conductive layer, the transparent conductive layer is on the side of the photonic crystal layer facing away from the active light emitting layer and is in the hollow space, an end of the second conductive portion of the second electrode near the photonic crystal layer is in contact with the transparent conductive layer.

14. The optical system of claim 12, wherein the first electrode comprises a third conductive portion, an orthographic projection of the photonic crystal layer onto the active light emitting layer is within an orthographic projection of the third conductive portion onto the active light emitting layer.

15. The optical system of claim 14, wherein the first conductive portion of the second electrode encloses an accommodation space having a notch, the third conductive portion is in the accommodation space.

16. The optical system of claim 15, wherein the first electrode further comprises a fourth conductive portion and an extension portion, the extension portion extends from the third conductive portion to the fourth conductive portion through the notch, the fourth conductive portion is located outside the accommodation space.

17. The optical system of claim 11, wherein the driving module is a transistor.

18. The optical system of claim 17, wherein the driving module is a gallium nitride transistor.

19. The optical system of claim 17, wherein the driving module comprises an electrode layer, the electrode layer comprises a gate electrode, a source electrode, and a drain electrode insulated from each other; the gate electrode is in contact with the second electrode, the drain electrode is in contact with the first electrode, when a voltage on the gate electrode is greater than a threshold voltage of the driving module, the source electrode and the drain electrode are turned on, and the drain electrode and the gate electrode are configured to apply the driving signals to the first electrode and the second electrode.

20. The optical system of claim 17, wherein the driving module comprises an electrode layer, the electrode layer comprises a gate electrode, a source electrode, a drain electrode, and a connecting electrode insulated from each other; the drain electrode is in contact with the first electrode, the drain electrode is in contact with the first electrode, when a voltage on the gate electrode is greater than a threshold voltage of the driving module, the source electrode and the drain electrode are turned on, the drain electrode is configured to apply the driving signals to the first electrode; the connecting electrode is in contact with the second electrode and configured to apply the driving signals to the second electrode.

* * * * *